(No Model.)
S. W. KEASLING.
GATE.
No. 399,619. Patented Mar. 12, 1889.
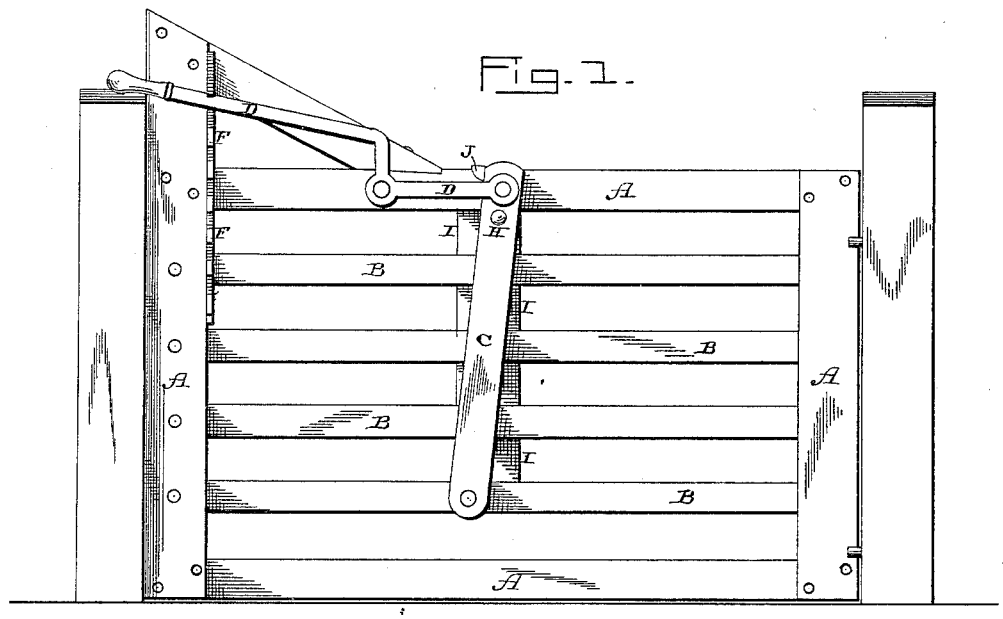
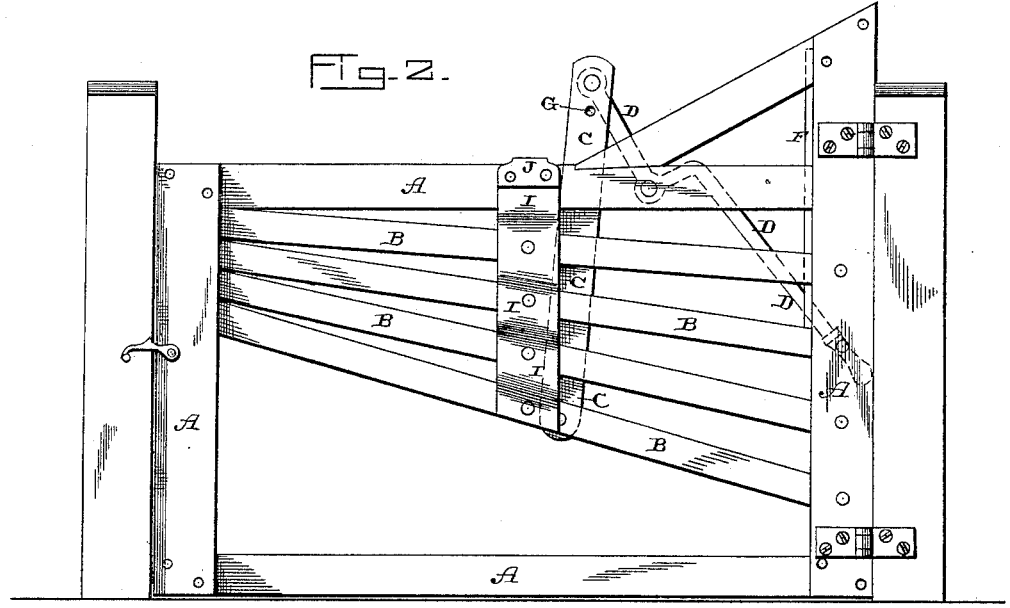
Witnesses:
E. P. Ellis,
L. L. Burket.
Inventor:
Saml. W. Keasling,
per F. A. Lehmann,
atty.

UNITED STATES PATENT OFFICE.

SAMUEL W. KEASLING, OF BICKWELL, INDIANA.

GATE.

SPECIFICATION forming part of Letters Patent No. 399,619, dated March 12, 1889.

Application filed November 22, 1888. Serial No. 291,523. (No model.)

*To all whom it may concern:*

Be it known that I, SAMUEL W. KEASLING, of Bickwell, in the county of Knox and State of Indiana, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in, first, a gate having a rigid frame-work, with bars which are pivoted therein at one end and are freely movable at the other, and an operating mechanism whereby the free end of the bars can be raised and lowered without affecting the frame in any manner; second, the combination of the rigid frame-work of the gate, the bars which are pivoted at one end, a lifting-rod connected to the lower bar, and a lever for operating the rod, and, third, the arrangement and combination of parts, which will be more fully described hereinafter.

The object of my invention is to provide a farm-gate in which the bars are adapted to be raised at one end without affecting the frame of the gate, so as to allow small animals to pass freely through.

Figure 1 is a side elevation of a gate embodying my invention, showing the parts in their normal positions. Fig. 2 is a similar view taken from the opposite side, showing the bars raised at one end.

A represents the frame of the gate, which is made perfectly rigid and which has no other than a swinging movement as the gate is opened and closed. Pivoted to the inner end of this frame are a suitable number of bars, B, which are left free at their outer ends, so that they can be freely raised and lowered, at the will of the operator, to form an opening through the gate to allow the passage of small animals from one field to the other without having partially to open, raise, or in any wise move the frame itself.

Connected to the lower bar upon one side of the gate is the elevating-rod C, which is connected to the operating-lever D at its upper end. The lever is pivoted upon the side of the gate, and its outer end engages with the ratchet F, for the purpose of holding the rod in any position in which it may be adjusted. This rod being connected at its lower end to the lower bar only, each bar successively raises the bar above it as the outer end of the lever is depressed by striking against it, and so on to the top. Through the upper end of the rod, just below the top piece of the frame A, is made a hole, G, through which a locking-pin, H, may be passed, which pin, by catching against the under side of the top pieces of the frame will prevent any upward movement of the lower bar.

Upon the opposite side of the gate from the lifting-post all the bars B are connected together by a flexible connection, I, for the purpose of supporting each of them in its normal position. This connection I may be a piece of chain, canvas, leather, or any flexible substance which will allow the ends of the bars to be raised. This connection, as the bars are raised, doubles up, as shown in Fig. 2. To the upper end of this connection is fastened a hook, J, for the purpose of catching over the top cross-piece of the frame, and thus preventing the panels from dropping below a horizontal position. This connection serves no other purpose than simply to support the bars when in their normal position; and when only the lower bars are raised it continues to support the upper ones in a horizontal position.

Heretofore it has been customary to raise one end of the gate; but this is objectionable, for the reason that every part of the frame of the gate must be pivoted, requiring more pivotal bolts and a more costly and complicated construction than is here shown, where only the ends of the bars are raised.

Having thus described my invention, I claim—

1. The combination of the rigid frame-work, the pivoted bars, and the flexible connection fastened to the bars, whereby the bars are supported in a horizontal position, but are left free to move upward, substantially as described.

2. The combination of the rigid frame, the bars pivoted therein at one end, the lifting-rod connected to the lower bar, the operating-lever, and a device for locking the lever in position, substantially as set forth.

3. The combination of the rigid frame, the bars pivoted thereon at one end, the lifting-rod, the operating-lever, and the flexible connection for supporting the bars in a horizontal position, substantially as specified.

In testimony whereof I affix my signature in presence of two witnesses.

SAMUEL W. KEASLING.

Witnesses:
W. S. TROUTMAN,
JOHN G. HART.